United States Patent Office 3,379,165
Patented Apr. 23, 1968

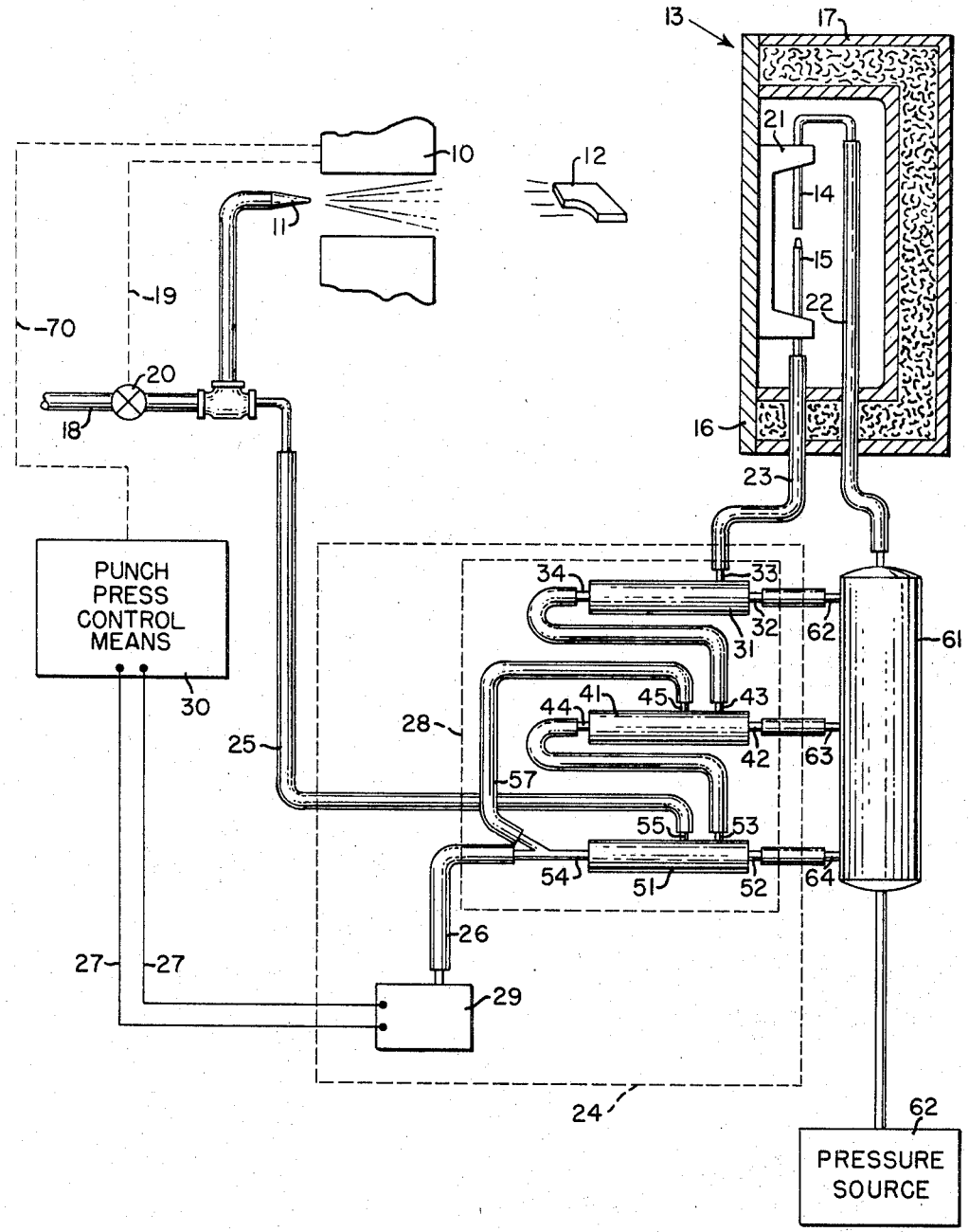

3,379,165
OBJECT DETECTING SYSTEM
Richard C. Mott, Harwood Heights, Ill., assignor to Honeywell Inc., Minneapolis, Minn., a corporation of Delaware
Filed June 16, 1966, Ser. No. 558,103
9 Claims. (Cl. 116—65)

The invention relates generally to systems that determine whether a machine has properly completed its operational cycle. More specifically, the invention pertains to devices that sense or detect the ejection of a part produced by a manufacturing machine and the incorporation of such a device into a system that determines part ejection and thereby controls continuation of the machine operation cycle.

Present ejected part detecting devices depend on physical displacement of a movable member of the device upon being struck by the object to actuate, for example, the contacts of an electric switch that is wired in series with the relay to transmit a continuation signal. The system described herein employs a novel ejected part detecting device that has no moving parts, depending upon a sound-sensitive, turbulence-type fluid amplifier to achieve the detecting function. The system also makes use of turbulence amplifiers in the means that links the ejected part detecting device with the machine control. The advantages of using fluidic devices in such a system are manifold, as will be pointed out below.

Turbulence amplifiers are now well established in the fluid amplifier art. They generally consist of an input tube and an output tube, arranged in axial alignment and spaced a short distance apart. A pressure source supplies fluid to the input tube so that a free-flowing laminar jet issues therefrom. In the absence of a disturbance the jet is captured by the output tube. A very small control jet that impinges on the free-flowing jet causes turbulence to occur, appreciably reducing the amount of flow captured by the output tube. Upon removal of the control jet, laminar flow is restored and the output pressure increases.

Recently, attention has been focused on the phenomenon of sound sensitivity in free-flowing fluid jets, a field in which knowledge has existed for quite some time. This interest has been stimulated by the development of the fluidics art, particularly the work done in relation to turbulence amplifiers. The phenomenon occurs under flow conditions that are not yet completely understood. Under these conditions, a sound wave of sufficient intensity and frequency can cause a fluid jet to experience a flow disturbance. If the jet is laminar, but because of its flow parameters it approaches a state of turbulence, a sound wave can prompt the jet to become turbulent. If provision is made to capture the laminar jet, as is done with a turbulence amplifier, it follows that the output, or portion of the jet captured, can be varied as a function of sound.

The present invention utilizes this knowledge of turbulence amplifiers and sound sensitive jets in providing a novel ejected part detecting device that has no moving parts, using only the sound of the ejected part striking the device as the sensing means. With proper design and adjustment, the device is sensitive only to the sound produced by the ejected part striking the device, thus preventing operation by sounds generated in the surrounding area.

The detecting device itself is virtually tireless since it does not demand the fatiguing physical displacement of the member that is struck time after time by ejected parts. This results in less wear and maintenance and far less chance of a breakdown, factors which are amplified greatly when safety is considered. Further, the simplicity of design as compared to similar devices having moving parts requires much less in the way of manufacturing time and expense.

The foregoing applies doubly to the system into which the detecting device is incorporated, for it also makes use of fluidic devices to achieve a bistable function. In so doing there is provided a safe, simple, reliable and inexpensive system for determining part ejection of a manufacturing machine.

Other features and advantages of the invention can be realized when the description below is read in accompaniment with the drawing in which a single figure represents the preferred embodiment.

In the drawing, a punch press die 10 is shown with a pneumatic pressure device 11 for ejecting a stamped metal part 12. Operation of the die 10 is governed by a punch press control means 30 through a linkage represented generally by the dotted line 70. The ejecting device 11 operates as a function of the punch press die movement as shown by a linkage 19 and a valve 20, directing a blast of air under high pressure from a pressure line 18 at the part 12 after it has been stamped, thereby blowing it from the die 10.

An ejected part detector, shown generally at 13, is positioned to be struck by the ejected part 12. Ejected part detector 13 comprises a turbulence-type fluid amplifier having an input means 14 and an output means 15, a metal plate 16 and a sound-insulating box 17. The turbulence amplifier is mounted on the plate 16, as by bracket 21. The plate 16 is preferably made of some type of metal, although other materials can be used. The sound-insulating box 17 is mounted over the turbulence amplifier, leaving the plate 16 exposed so that sounds other than that generated by the part 12 striking the plate 16 will not reach the turbulence amplifier. Pressure is supplied to the input means 14 of the turbulence amplifier through an input tube 22, and the flow from output means 15 is transported through an outlet tube 23.

A utilization means that links the detector 13 with the punch press control means 30 is shown generally at 24. In the preferred embodiment it comprises a pneumatic bistable element shown generally at 28 and a pressure-to-electric transducing switch 29. Utilization means 24 includes two pneumatic control inputs and an electric output. One control input 33 is coupled with turbulence amplifier output 15 by the tube 23. The other control input 55 is connected with the pressure supply line 18 of ejecting device 11 by a tube 25. Electric leads 27, 27 serve as the electric output and are adapted to communicate with the punch press control means 30.

The bistable element 28 comprises three turbulence amplifiers 31, 41, 51. Turbulence amplifier 31 has a power input 32, a control input 33, and an output 34. Turbulence amplifier 41 has a power input 42, control inputs 43, 45 and an output 44. Turbulence amplifier 51 has a power input 52, control inputs 53, 55 and an output 54. The output 34 of tubulence amplifier 31 is coupled with the control input 43 of turbulence amplifier 41, and the output 44 of turbulence amplifier 41 is coupled with the control input 53 of the turbulence amplifier 51. The output 54 communicates with the pressure-to-electric switch 29 through tube 26 and also communicates with control input 45 of turbulence amplifier 41 through a feedback line 57.

The input power stream for each turbulence amplifier is provided through tubes 62, 63, 64 by a manifold 61 which also supplies fluid power to the turbulence amplifier input means 14 of ejected part detector 13 through tube 22. Manifold 61 receives a pressure supply from a regulated pressure source 62.

In operation, it is assumed that turbulence amplifier inputs 14, 32, 42, 52 are receiving a constant pressure-regulated flow from manifold 61. Initially, the part 12 is stamped by the die 10 of the punch press whereupon a high pressure air pulse is transmitted by means not shown through pressure line 18 to part ejecting device 11. Part of the air pulse is picked off by line 25 and carried to input 55 of turbulence amplifier 51, thereby setting the bistable element 28 in a stable "off" position with no pressure issuing from output 54. Bistable element 28 will remain in this "off" position after the air pulse has terminated for the following reason. The turbulence amplifier output means 15 in the ejected part detector 13 is generating an output signal since nothing has yet occurred that would disturb the laminar stream issuing from input means 14. This output signal travels through connecting line 23 to control input 33 where it impinges on and causes the input power stream issuing from input 32 to become turbulent, reducing the output of turbulence amplifier 31 essentially to zero. Since no flow issues from output 34, turbulence amplifier 41 receives no disturbing signal through control input 43. Neither is a disturbing signal introduced through feedback line 57 to input 45 since turbulence amplifier 51, as mentioned above, is momentarily disturbed by the pulse from pressure line 18. Turbulence amplifier 41, then, produces an output flow that is carried to control input 53 of turbulence amplifier 51 where it serves as a disturbance to the input power stream issuing from input 52, even after the pulse disturbance from pressure line 18 has terminated. Assuming no further disturbances turbulence amplifier 41 is capable of producing a continuous output, thus preventing turbulence amplifier 51 from providing the pressure necessary to close the pressure-to-electric switch 29. So long as switch 29 remains open no signal can be carried to the punch press control means 30, and the part stamping process of the punch press is halted.

If the ejecting device 11 operates successfully by reason of the air blast from pressure line 18, the ousted metal part 12 will strike the exposed metal plate 16, creating a sound wave of sufficient intensity and frequency to disturb the sound-sensitive input power jet issuing from input means 14. Upon sonic disturbance this laminar jet becomes turbulent, causing the output pressure passing through output means 15 to be reduced essentially to zero. In the absence of an output pressure from output means 15. there is no signal passing through control port 33 to disturb the input power jet of turbulence amplifier 31, and its output pressure accordingly increases. This pressure is transmitted to control input 43 thereby disturbing the input power stream of turbulence amplifier 41. This appreciably decreases the pressure passing through output 44 and control input 53, and since there is no longer a pressure pulse from pressure line 18, the input power stream of turbulence amplifier 51 goes undisturbed and an output pressure issues from output 54. The bistable element 28 is now in a stable "on" position, generating sufficient pressure to close the pressure electric switch 29 and transmit a signal to the punch press control means 30, informing the punch press that the way is clear to stamp another part. Without another pressure pulse from line 18 bistable element 28 will remain in its stable "on" position because part of the output of turbulence amplifier 51 is picked off by feedback line 57, passing through control input 45 to disturb the power input stream of turbulence amplifier 41. Without an output pressure from turbulence amplifier 41, there is no input signal to disturb the input power stream of turbulence amplifier 51, and the process continues. A pressure pulse from line 18 will restore bistable element 28 to its original "off" position by disturbing the input power stream of turbulence amplifier 51, thereby allowing turbulence amplifier 41 to again produce an output pressure. The cycle continues upon successful ejection of another part 12.

Although I use in the preferred embodiment a pneumatic bistable element in conjunction with a pressure-to-electric transducer switch to transmit the continuation signal from the ejected part detector to the punch press control means, it is, of course possible to utilize other combinations of pneumatic and electric devices to accomplish this function. It is to be understood that these and other modifications can be made without departing from the scope of my invention, and I wish to be limited only by the scope of the appended claims.

I claim as my invention:

1. A fluidic device for detecting moving objects, comprising:
   means for generating sound upon being struck, said means for generating sound adapted to be struck by a moving object;
   sound insulating means attached to said means for generating sound to form a substantially sound proof chamber;
   and turbulence-type fluid amplifier means disposed within said chamber, said fluid amplifier means having an input means and an output means, said input means adapted for connection to a pressure source means whereby said input means issues a free-flowing, laminar jet, said output means disposed in substantial axial alignment with said input means to capture said laminar jet and provide an output pressure, said laminar jet being caused to become turbulent by the sound generated by said moving object striking said means for generating sound.

2. The device as defined in claim 1, wherein said sound generating means comprises a plate-like member.

3. The device as defined in claim 1 wherein said sound generating means comprises a metallic plate.

4. The device as defined in claim 3 wherein said sound-insulating means comprises a sound-insulating box with an open side, said metallic plate attached to said box to cover said open side.

5. The device as defined in claim 4, wherein said turbulence amplifier means is mounted on said metallic plate.

6. A system for controlling the operational cycle of a part ejecting machine, including:
   ejected part detecting means adapted to be struck by an ejected part, comprising:
      means for generating sound upon being struck;
      sound insulating means attached to said means for generating sound to form a substantially sound proof chamber;
      a turbulence-type fluid amplifier means disposed within said chamber, said fluid amplifier means having an input means and an output means, said input means adapted for connection to a pressure source means whereby said input means issues a free-flowing, laminar jet, said output means disposed in substantial axial alignment with said input means to capture said laminar jet and provide an output pressure, said laminar jet being caused to become turbulent by the sound generated by said ejected part striking said means for generating sound;
   and utilization means compirsing:
      bistable means having a first input means and a second input means, said first input means connected to the output means of said turbulence-type fluid amplifier means, said second input means adapted for connection to a part ejecting means of said part ejecting machine, said bistable means providing an output signal that changes as a function of the output pressure of said amplifier means and the operation of said part ejecting means;
   and communication means to transmit said output signal to said part ejecting machine to control the operational cycle of said part ejecting machine.

7. The system as defined in claim 6, wherein said bistable element comprises first, second and third turbulence amplifiers; said first turbulence amplifier including power input means, control input means and output means, said second turbulence amplifier including power input means, first and second control input means and output means; said third turbulence amplifier including power input means, first and second control input means and output means; said power input means of all three turbulence amplifiers receiving fluid from said pressure source means; the output means of said first turbulence amplifier in communication with the first control input means of said second turbulence amplifier; the output means of said second turbulence amplifier in communication with the first control input means of said third turbulence amplifier; the output means of said third turbulence amplifier in communication with both the second control input means of said second turbulence amplifier and said communication means; the control input of said first turbulence amplifier connected with the output means of said turbulence-type fluid amplifier means; and the second control input means of said third turbulence amplifier adapted for connection to the part ejection means of said part ejecting machine.

8. The system as defined in claim 6, wherein said communication means comprises a pressure-to-electric transducing means.

9. The system as defined in claim 6, wherein said sound generating means comprises a metallic plate with said turbulence-type fluid amplifier means mounted on said metallic plate.

References Cited

UNITED STATES PATENTS

| | | | |
|---|---|---|---|
| 1,205,530 | 11/1916 | Hall | 137—81.5 XR |
| 1,549,196 | 8/1925 | Hall | 340—253 |
| 1,628,723 | 5/1927 | Hall | 137—81.5 XR |
| 2,970,503 | 2/1961 | Chevallier | 83—61 |
| 3,015,977 | 1/1962 | Stegink et al. | 83—61 |
| 3,023,283 | 2/1962 | Wintriss | 200—61.41 |
| 3,077,966 | 2/1963 | Cohn | 192—125 |
| 3,160,045 | 12/1964 | Newgard | 83—63 |
| 3,234,955 | 2/1966 | Auger | 137—8.15 |
| 3,247,339 | 4/1966 | Miller | 200—61.01 |

LOUIS J. CAPOZI, *Primary Examiner.*